June 24, 1930. G. HOLST 1,767,132
LIGHT VALVE
Filed April 5, 1928
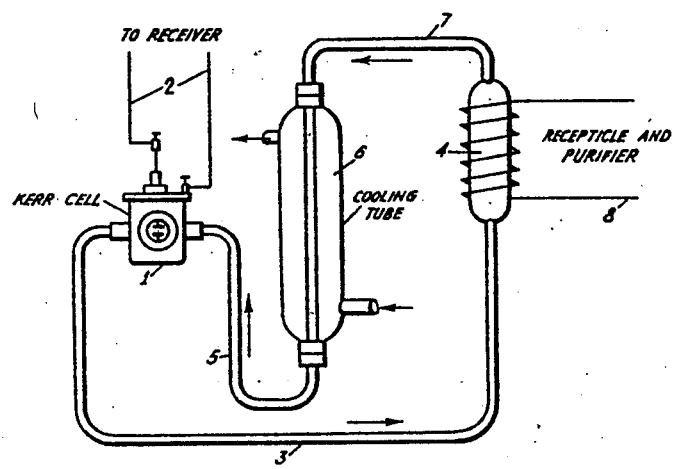
INVENTOR
GILLES HOLST
BY Ira J. Adams
ATTORNEY Patented June 24, 1930

1,767,132

UNITED STATES PATENT OFFICE

GILLES HOLST, OF EINDHOVEN, NETHERLANDS, ASSIGNOR TO RADIO CORPORATION OF AMERICA, A CORPORATION OF DELAWARE

LIGHT VALVE

Application filed April 5, 1928, Serial No. 267,697, and in the Netherlands April 13, 1927.

This invention has reference to a process of influencing a beam of light so as to obtain different light intensities by means of a Kerr cell for the use of telephotography or television.

If an electric voltage is supplied to the condenser plates of a Kerr cell, the liquid dielectricum will obtain double refractive characteristics. If, therefore, a polarized beam of light is caused to fall through the double refractive liquid, the beam of light will be changed into two components whose plane of polarization is perpendicular or parallel respectively to the direction of the electric lines of force. The phase difference of the components emerging from the Kerr cell and thus the rotation of the plane of polarization of the emerging ray relatively to the incident one is determined for a Kerr cell of given dimensions and for a definite voltage supplied by the characteristics of the dielectricum. In order to obtain a maximum effect, liquids of highly refractive power and highly insulating characteristics are used.

Starting from this principle Sutton suggested in 1890 a method by which the intensity of a beam of light can be controlled by means of electric oscillations, and based on this method, he constructed a device which permits of photographs being transmitted electrically. It is evident that in the case of the arriving electric oscillations being too weak to give a perceptible rotation to the plane of polarization of the incident beam of light, the well known thermionic discharge tubes which have been generally used for more than ten years for amplifying electric oscillations of any kind, are resorted to. Among the liquids which are suitable as a dielectricum in a Kerr cell are carbon disulphide, nitrobenzene and similar liquids of highly refractive power which have been used already at the time during which Kerr conducted his experiments. It is obvious that the insulating characteristics of the dielectricum, which are a prime condition for the correct working of the Kerr cell or as it is sometimes termed the Kerr condenser, are in intimate relation with the purity of the liquid used.

The invention, therefore, has for its object that of suggesting a method that guarantees the purity and thus the highly insulating characteristics of the dielectricum during the use of the Kerr cell. According to the invention as illustrated by the single figure of the drawing the said liquid is caused to flow in a very pure condition along the condenser plates of the Kerr cell. If desired, the liquid flowing from the condenser may be subjected to a purifying process and be supplied again to the condenser so that a definite quantity of liquid circulates through the condenser. This method guarantees at any moment a high grade of purity of the condenser liquid and thus a maximum insulating power.

To now make more specific reference to the accompanying drawing which represents in diagrammatic form a device by which the process, above outlined, may be carried out, 1, represents the Kerr cell of the usual type between the electrodes of which a potential difference may be supplied by means of lead-in wires 2 so that potentials varying in accordance with the varying intensities in light and shade in the picture or other similar image to be reproduced are applied to the said electrodes. The cell 1 is connected through a tube 3 with a receptacle 4 and, by another tube 5, with a cooling device 6. A connecting tube 7 is arranged to connect the receptacle 4 and the cooling device 6 and this together with the Kerr cell forms a closed system that contains a suitable dielectric for use in connection with the Kerr cell of which I may mention, for example, nitrobenzene.

If the receptacle 4 is suitably heated, for example, by an electric heating coil 8, or even by a flame the liquid contained therein will, as a result of the thermo-siphonic action, tend to flow in the direction indicated by the arrows on the accompanying drawing. If desired, however, suitable pumping means for insuring the circulation of the liquid in addition to the electric heating means illustrated might be supplied but it is to be regarded that one means is the equivalent of the other. The temperature of the dielectric substance or Kerr-liquid passing to the cell 1 is regulated by circulating water or other appropriate cooling medium which is passed in and out of the cooling tube 6 in accordance with the showing of the arrows entering and leaving the cooling tube 6.

In the receptacle 4 a suitable purifying agent for insuring that the circulating liquid such as nitrobenzol remain in a highly purified state is provided. For this operation all kinds of suitable chemical or physical means and, if desired, an electrostatic field may be employed in the purifying operation.

Having described my invention, what I claim is:

1. A system for supplying dielectric material to Kerr cells and the like which includes a closed liquid dielectric material supply system having the Kerr cell forming one part thereof, a dielectric purifying means also forming one part of said closed supply system, and means for continually circulating said dielectric material through said supply system.

2. A Kerr cell having a dielectric substance between the plates thereof, means for continuously withdrawing impure dielectric material from said cell, means for purifying said withdrawn dielectric material, and means for continually supplying fresh and purified dielectric material to said cell.

3. A means for insuring high purity of dielectric material in Kerr cells or the like which includes means for supplying dielectric material to the cell, means for purifying the material supplied to said cell, means for continuously circulating said material through said cell and the purifying means so as to cause impure dielectric material to continuously pass from said cell to said purifying means and pure dielectric material from said purifying means to said cell whereby the cell is at all times subject to the influence of pure dielectric material.

4. A Kerr cell system for controlling light passing therethrough in accordance with fluctuations in electric potentials supplied thereto which includes means for continuously supplying to said cell a pure liquid medium adapted to become double refractory under the influence of the electric potentials, means for passing the said medium beyond said cell as the said medium becomes impure due to the action of the electric field thereon, means for continually purifying the impure material, and means for resupplying said purified medium to said cell so that said electric potentials applied to said cell will continually act upon a highly purified medium.

GILLES HOLST.